UNITED STATES PATENT OFFICE.

ALFRED HUSSELBEE, OF STAIRFOOT, BARNSLEY, ENGLAND, ASSIGNOR TO DAN. RYLANDS, OF STAIRFOOT, ENGLAND.

GLASS-LINED BEND, ELBOW, OR PIPE-FITTING.

SPECIFICATION forming part of Letters Patent No. 476,648, dated June 7, 1892.

Application filed January 14, 1892. Serial No. 418,072. (No model.) Patented in England March 27, 1890, No. 4,792.

*To all whom it may concern:*

Be it known that I, ALFRED HUSSELBEE, a subject of the Queen of Great Britain, and a resident of Stairfoot, Barnsley, England, have invented certain new and useful Improvements in the Process for Manufacturing Glass-Lined Bends, Elbows, or Pipe-Fittings, (for which I have obtained a patent in Great Britain, No. 4,792, dated March 27, 1890,) of which the following is a specification.

My invention relates to improvements in the manufacture of glass-lined bends, elbows, or pipe-fittings, and comprises an improved process for the manufacture of glass bends, and also comprises a process for the manufacture of T-angle, cross, and other junction pieces lined with glass which is inserted therein in the manner hereinafter described, which is a cheap, expeditious, and efficacious one and constitutes an important feature of my said invention.

In the accompanying drawings, Figures 1 and 2 show my present invention as applied to the manufacture of T pieces or crosses of the kind hereinbefore referred to.

To line bends, elbows, or fittings of the chamber shown in the drawings, I proceed as follows: I take a piece of glass tube F of any suitable length and heat one end of such tube in the furnace to a red heat. I then seal the hot end of this tube either by closing it over with a pair of tools or with some hot metal from the pot. I then pass the hot end of this tube through a metal T-piece—for example, such as that shown in Fig. 2—such T-piece having been heated sufficiently hot before the glass is put therein. Immediately this hot tube F is in the proper position I drop some hot metal through the vertical portion G of the T-piece and by blowing through the cold end of the tube I force up the vertical portion H, thus forming a glass T. Another way of making these T pieces or crosses is by gathering a small quantity of molten glass on the end of a blowpipe and so molding this metal that it can be easily passed through the horizontal portion of the T-piece. After it has thus been passed through the horizontal part a little hot metal is dropped down the vertical part, the sticking-pontil J, which is used for dropping this metal, being kept attached to it, so as to help to pull the metal up as the blower blows the molten glass up from the horizontal portion of the glass T, and thus a complete T is formed. In making crosses I first blow up the one vertical portion H' and make it air-tight in any suitable manner. I, however, prefer to do so by pinching the glass close or cutting it off the blow-tube out of solid metal at the end of such blow-tube. I then drop hot metal into the opposite vertical portion II and blow this up, the blowing being assisted by the gentle rising of the pontil J, which carries the hot metal.

The invention is not limited to lining bends, elbows, or fittings of the character shown in the drawings; but is equally applicable to lining elbows, bends, and fittings of other forms.

What I claim is—

1. The improved process for the manufacture of glass-lined bends and elbows, consisting in passing a closed-ended hot-glass tube into a heated-metal bend or elbow and then blowing the hot-glass tube against the walls of the metal bend or elbow and subsequently cutting or wetting off the blowing-tube and the burst-off.

2. The improved process for the manufacture of glass-lined junction-pieces, consisting in passing a closed-ended hot-glass tube into one arm of a heated-metal junction-piece and then dropping hot glass into the other arm or arms of the said junction-piece and blowing into the tube, thereby forming a hole at the junction or junctions and forcing the glass up into and against the walls of the several arms of the metal junction-pieces, thus completing the lining of the same, substantially as set forth.

In testimony whereof I have signed my name in the presence of two subscribing witnesses.

ALFRED HUSSELBEE.

Witnesses:
A. A. INMAN,
E. JACKSON.